United States Patent
Axford

(10) Patent No.: US 9,701,391 B2
(45) Date of Patent: Jul. 11, 2017

(54) AIRCRAFT STRUCTURE COMPRISING A SKIN PANEL

(75) Inventor: Timothy Axford, Bristol (GB)

(73) Assignee: Airbus Operations Limited, Bristol (GB)

( * ) Notice: Subject to any disclaimer, the term of this patent is extended or adjusted under 35 U.S.C. 154(b) by 970 days.

(21) Appl. No.: 13/297,581

(22) Filed: Nov. 16, 2011

(65) Prior Publication Data

US 2012/0132748 A1    May 31, 2012

(30) Foreign Application Priority Data

Nov. 29, 2010  (GB) .................................... 1020189.5

(51) Int. Cl.
    *B64C 3/26*      (2006.01)
(52) U.S. Cl.
    CPC ...................... *B64C 3/26* (2013.01)
(58) Field of Classification Search
    CPC .................................. B64C 3/18; B64C 3/182
    USPC ......... 244/123.1, 123.13, 123.142; 156/73.4; 428/119, 184, 181; 416/226, 227 R
    See application file for complete search history.

(56) References Cited

U.S. PATENT DOCUMENTS

| | | | |
|---|---|---|---|
| 1,808,842 A * | 6/1931 | Fedor ....................... | 244/123.12 |
| 1,809,913 A * | 6/1931 | Semmes .................. | 244/123.12 |
| 2,241,972 A * | 5/1941 | Wagner .................... | 244/123.12 |
| 2,734,586 A * | 2/1956 | Wright et al. ............... | 416/226 |
| 3,028,292 A * | 4/1962 | Hinds ........................... | 156/214 |
| 3,118,639 A * | 1/1964 | Kiceniuk ....................... | 244/219 |
| 3,195,841 A | 7/1965 | Krohn | |
| 4,001,474 A * | 1/1977 | Hereth ......................... | 428/116 |
| 4,051,289 A * | 9/1977 | Adamson ...................... | 428/113 |
| 4,162,777 A * | 7/1979 | Gilbert et al. ............. | 244/123.7 |
| 4,223,053 A * | 9/1980 | Brogan ........................ | 428/34.5 |
| 4,617,072 A * | 10/1986 | Merz ........................... | 156/89.25 |
| 4,749,155 A * | 6/1988 | Hammer et al. ........... | 244/123.7 |
| 5,360,500 A | 11/1994 | Evans et al. | |
| 7,954,763 B2 * | 6/2011 | Kulesha ..................... | 244/123.1 |
| 8,714,485 B2 * | 5/2014 | Matheson ............... | B64C 3/182 |
| | | | 244/123.1 |
| 2010/0006700 A1 | 1/2010 | Stuhr et al. | |

FOREIGN PATENT DOCUMENTS

| | | |
|---|---|---|
| EP | 2 008 807 | 12/2008 |
| EP | 2 025 504 | 2/2009 |
| FR | 2 936 181 | 3/2010 |

(Continued)

OTHER PUBLICATIONS

EP Extended Search Report dated Mar. 22, 2012 in EP 11188807.9-2422.

(Continued)

*Primary Examiner* — Tien Dinh
(74) *Attorney, Agent, or Firm* — Nixon & Vanderhye P.C.

(57) ABSTRACT

An aircraft structure 101 comprising a skin panel 111, having an outer surface forming an external face of the structure, and an inner surface internal to the structure, the aircraft structure 101 also comprising a plurality of stringers 150 extending along a length of the inner surface of the skin panel, and an inner panel 112 spaced apart from the inner surface of the skin panel 111, so as to form an internal cavity adjacent to the skin panel, and wherein the stringers 150 are located within the cavity.

15 Claims, 9 Drawing Sheets

(56) References Cited

FOREIGN PATENT DOCUMENTS

| GB | 2 225 742 | 6/1990 |
|----|-----------|--------|
| JP | 2002-293295 | 10/2002 |
| SE | 1 777 297 | 5/1997 |

OTHER PUBLICATIONS

UK Search Report dated Mar. 24, 2011, for GB Application No. 1020189.5.

* cited by examiner

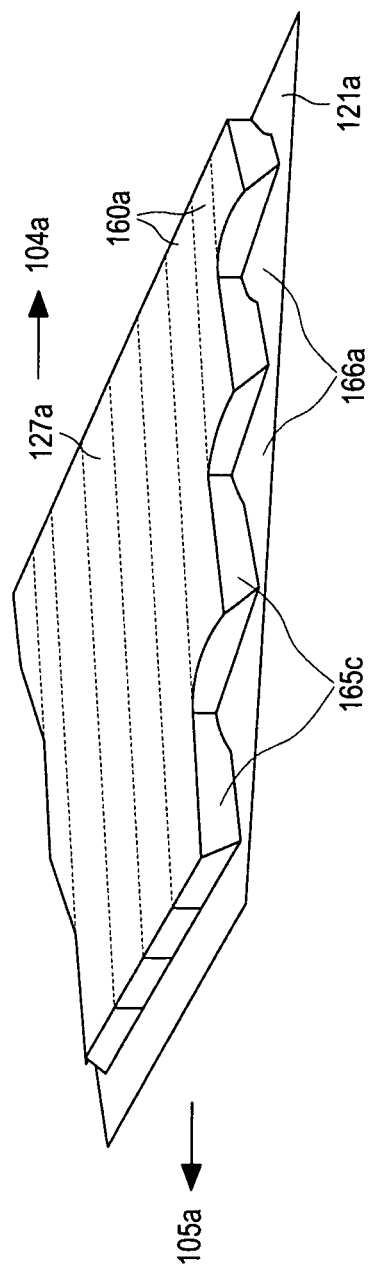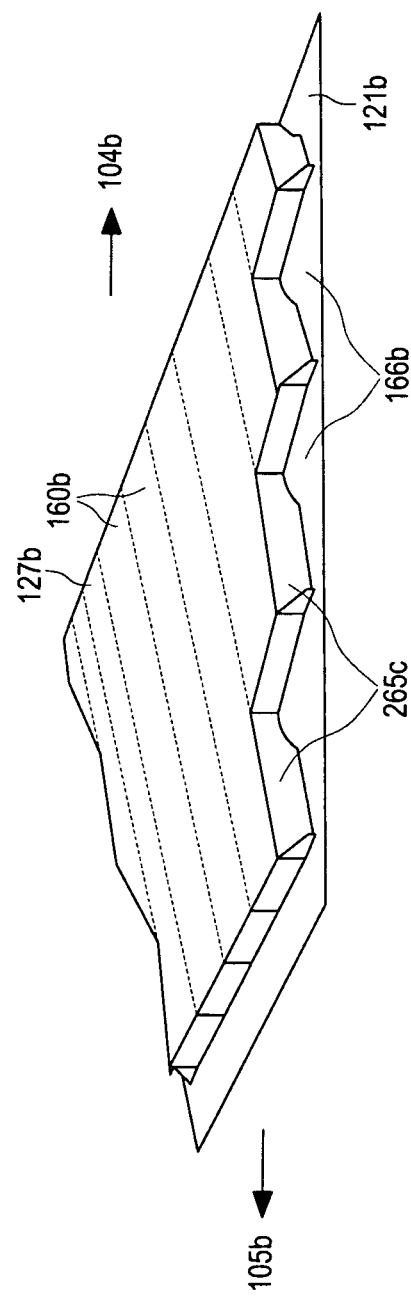

AIRCRAFT STRUCTURE COMPRISING A SKIN PANEL

This application claims priority to GB Application No. 1020189.5, filed 29 Nov. 2010, the entire contents of each of which are hereby incorporated by reference.

BACKGROUND OF THE INVENTION

The present invention concerns structures forming part of an aircraft. More particularly, but not exclusively, this invention concerns an aircraft structure comprising a skin panel, having an outer surface forming an external face of the structure, and an inner surface internal to the structure, and a plurality of stringers extending along a length of the inner surface of the skin panel. The invention also concerns a method of manufacturing an aircraft structure, comprising the steps of providing an external skin panel and providing a plurality of stringers extending along a length of an inner surface of the skin panel.

Traditional wing boxes comprise an upper skin and a lower skin, one or more spars extending along a length of the wing box, a plurality of stringers extending along a length of the skins and a plurality of ribs in between the two skin panels, extending across the width and depth of the wing box. However, the cost of the stringers of the wing box is very expensive and they are vulnerable to damage during manufacture, assembly and maintenance. This is especially so if the stringers are made from composite materials. This is because composite stringers are formed with free edges having exposed laminate layers which, when knocked, can cause flaking (known as delamination) of the laminate layers. In addition, the inner mould lines (IML) of the inner surface of the skin panels and the stringers are complex which requires complicated tooling and manufacture. In addition, a large number of ribs have to be used in order to prevent the structure from buckling. This adds significant weight to the structure, which is undesirable.

US 2010/0006700 discloses an aircraft wing with wing skins made from webbed panels. These panels are made from two face sheets with a stiffening web sandwiched between them. The web has a repeating pattern of a sinusoid across the width of the wing. However, the repeating pattern of the web makes the panels complicated and relatively costly to manufacture. In addition, it is not possible to vary the geometry of the stiffening web. Therefore, the web cannot be optimised based on a predicted load distribution in the wing. Furthermore, the sinusoidal pattern of the web is not particularly efficient.

The present invention seeks to mitigate the above-mentioned problems. Alternatively or additionally, the present invention seeks to provide an improved aircraft structure or method of manufacture of an aircraft structure.

SUMMARY OF THE INVENTION

The present invention provides, according to a first aspect, an aircraft structure comprising a skin panel, having an outer surface forming an external face of the structure, and an inner surface internal to the structure, and a plurality of stringers extending along a length of the inner surface of the skin panel, wherein the structure also comprises an inner panel spaced apart from the inner surface of the skin panel and being internal to the structure, so as to form an internal cavity adjacent to the skin panel, and wherein the stringers are located within the cavity.

Here, structure is intended to mean a collection of members used to form a structure of an aircraft. Each structure is a collection of members that are designed together to withstand the loads experienced in use as part of the aircraft. A part of an aircraft would not be considered to be a structure if it was missing a member (for example, a skin panel) that was needed for the aircraft to withstand the typical loads experienced during use. For example, if the part is a part of a wing box, the part must be able to withstand the bending moments that it will experience during use as part of the wing box. Hence, a structure comprises all members necessary to allow it to withstand the required loads but does not necessarily comprise other elements, such as coverings, fixtures and fittings etc. that are not considered to help withstand the required loads.

Here, stringer is considered to be a longitudinal stiffening element that helps to prevent buckling of the skin panel. A stringer is generally long and thin with a high aspect ratio. A stringer is generally narrow.

Embodiments of the invention have the advantage that the inner panel provides additional stiffness and carries additional load compared to just the skin panel. In embodiments of the invention, the stringers provide for a separation between the skin panel and inner panel. The skin panel and separated inner panel then carry load and provide stiffness to the structure. Therefore, a fewer number of ribs are required in order to provide a structure with the same stiffness. This reduces the weight and manufacturing cost of the structure.

In addition, the stringers are protected by the inner panel, meaning they are less exposed. This means that the stringers, especially composite material stringers, are less likely to be damaged during manufacture, assembly to the structure or aircraft, or during use or maintenance. As stringers are typically an expensive part of a structure (for example, two thirds the cost of a wing box), minimising this damage has significant cost savings.

The minimisation of damage to the stringers by use of an inner panel also means that less compensation has to be made for the reduction in working strain of the skin panel due to potential damage.

Also, having an inner panel provides the structure with a smooth Inner Mould line (IML), rather than an uneven IML from exposed stringers. This makes the structure much easier and cheaper to manufacture as a two-sided integrated tooling solution can be used.

Furthermore, the surface of the inner panel provides a smooth surface that can be used to attach ribs to. It is no longer needed to provide cut outs (known as mouse holes) in the ribs to allow space for stringers as the ribs do not pass over any exposed stringers.

Embodiments of the invention still allow easy access to the interior of the structure as the internal cavity in the structure is located towards the outside of the structure. This is especially important in structures such as wing boxes, as access is needed for maintenance etc.

Preferably the inner panel is designed to carry a significant amount of load of the aircraft structure. In other words, the inner panel is a fundamental part of the structure and adds to the structural strength of the structure. The structural properties of the inner panel are therefore considered when designing the structure. This means that less load is designed to be taken by the skin panel, stringers, ribs etc. and therefore these parts of the structure can be made lighter. The inner panel is not just a panel located in the structure, used for a non-structural purpose, such as stopping fuel moving around in an aircraft wing, for example.

Preferably, the cavity has a height between the skin panel and inner panel of between 40 and 60 mm, preferably approximately 50 mm.

Preferably, each stringer is a discrete element of the structure. Having the stringers as discrete elements means they can be manufactured separately and so can be more easily managed than for bigger components. This makes assembly of the structure easier. It also means that, prior to manufacture of the structure, a single damaged stringer can be replaced, without needing all the stringers to be replaced. Furthermore, having the stringers as discrete elements allows them to have different geometry from each other, and therefore allow the structure to be optimised based on the predicted load distribution in the structure. For example, different stringers can be different thicknesses. Also, the thickness along the length of a stringer may vary. This optimisation reduces the weight of the structure. Furthermore, having discrete stringers allows stiffening elements of the stringers to be substantially perpendicular to the skin panel and inner panel. This is because they do not have to extend along the width of the structure and form a continuous element. This makes a more efficient structure and enables the height of the cavity to be reduced. For a wing box structure, this increases the volume available for carrying fuel, for example and makes access to the interior of the wing box easier.

Preferably, each stringer has a width across the structure of between 150 mm and 250 mm, preferably approximately 200 mm.

Preferably, the stringers have a height so as to extend across the entire height of the cavity from the inner surface of the skin panel to the inner panel. Hence, the stringers can provide a "spacer" function to ensure that the inner panel is spaced apart from the skin panel. This makes the structure easier to manufacture.

Preferably, the stringers are arranged side-by-side in the cavity such that a side of each stringer abuts a side of an adjacent stringer. Preferably, there are substantially no gaps in between the stringers. Preferably, the stringers extend continuously across the entire width of the internal cavity. Preferably, the stringers provide the "spacer" function across the entire width of the internal cavity. Preferably, the inner surface of the skin panel and/or the inner panel abuts the stringers continuously along the entire width of the internal cavity.

Preferably, the stringers are in the form of hollow struts, so as to provide a plurality of elongate hollow stringer cells extending along the cavity. Having the stringers being hollow minimises the weight of the stringers whilst still providing a stiffening function. More preferably, the stringer cells have a cross-section substantially in the shape of a hollow rectangle. Having a rectangle shape allows the cells to easily line up next to each other in the cavity. Even more preferably, the stringer cells are arranged side-by-side in the cavity such that a side wall of each stringer cell abuts a side wall of an adjacent stringer cell so that there are substantially no gaps in between the cells. Having the side walls of the cells abutting each other provides the structure with a higher second moment of area as there is a double thickness of stringer side wall at those points. This gives an improved buckling resistance. Most preferably, the side walls of the stringer cells are bonded together. This helps to maintain the cells in position. The cell side walls may be bonded together by an adhesive. The cell side walls may be bonded together by co-curing the side walls at the same time, so that resin in the side walls co-cures to form a continuous matrix. Co-curing the stringer cells together allows for easier inspection and certification of the structure and means the structure is more efficient. It also makes the structure easier and cheaper to produce as an additional adhesive processing step is not required.

Preferably, the stringer cells have a cross-sectional shape with rounded corners. This reduces stress concentrations in the structure. More preferably, a spacer is disposed in the gap between the rounded corners of the stringer cells. This prevents the stringer cells from deforming into the space over the lifetime of the structure. Such a spacer is also referred to as a noodle.

Preferably, the walls of the stringer cells have a constant cross-section along the length of the stringers. This makes the stringers easier to manufacture.

Preferably, the walls of the stringer cells around their cross-section have a constant thickness. This makes the stringers easier to manufacture.

Preferably, the inner panel abuts the stringers. This provides a small, compact part of the structure and minimises damage from the inner panel being pressed against the stringers. More preferably, the inner panel is bonded to the stringers. This helps to maintain the stringers and inner panel in position. The inner panel may be bonded to the stringers by an adhesive. The inner panel may be bonded to the stringers by co-curing them at the same time, so that resin in the stringers and inner panel co-cures to form a continuous matrix. Co-curing the stringers and inner panel together allows for easier inspection and certification of the structure and means the structure is more efficient. It also makes the structure easier and cheaper to produce as an additional adhesive processing step is not required.

Preferably, the inner panel is bonded to the inner surface of the skin panel at an outer edge portion of the inner panel. This means that the inner panel can be secured to the rest of the structure by being bonded to the skin panel. This is done at an outer edge portion of the inner panel as the inner panel cannot be bonded to the skin panel where it is spaced apart from it (i.e. where the internal cavity is formed). The inner panel may be bonded to the skin panel by an adhesive. The inner panel may be bonded to the skin panel by co-curing them at the same time, so that resin in the skin panel and inner panel co-cures to form a continuous matrix. Co-curing the skin panel and inner panel together allows for easier inspection and certification of the structure and means the structure is more efficient. It also makes the structure easier and cheaper to produce as an additional adhesive processing step is not required.

More preferably, the inner panel comprises a central section spaced apart from the inner surface of the skin panel, an outer edge portion bonded to the inner surface of the skin panel and an angled intermediate portion extending towards the inner surface of the skin panel from the central section to the outer edge portion. The angled intermediate portion reduces stress concentrations in the structure.

Preferably, the stringers are enclosed at one or both sides of the cavity by the intermediate portion. More preferably, the stringer cell side wall at the side of the cavity is angled to correspond to the angled intermediate portion of the inner panel.

Preferably, the stringers have different lengths to substantially correspond to the varying length of the skin panel along its width. This allows the stringers to be "run out" gradually along the length of the structure, rather than all the stringers terminating at the same point along the length. This provides an efficient way of transmitting the load carried by the inner panel back into the skin panel as an end of the structure is reached. For example, in a wing box structure, the width of the wing box decreases towards the outer tip of the wing box. Hence, the number of stringers that can run along the wing box structure decreases towards the tip. This also means the width of an inner panel of the structure must decrease. By gradually "running out" the stringers, the load carried by the inner panel can be efficiently transmitted back into the wing skin panel towards the tip.

Preferably, the stringers comprise a layered composite material.

More preferably, the stringers are formed from winding filaments around a mandrel and then curing.

Preferably, each layer of the composite material has fibres orientated in a fibre direction and wherein the angles of the fibre direction in each of the composite layers are chosen such that, where two stringers are bonded to one another, the composite layers across the two stringers are symmetrical either side of a notional line. This provides for symmetrical loading of the bond. The notional line is preferably the centre of the two bonded parts of the structure. In other words, if the walls of the two stringers to be bonded together have the same width, the notional line will be the joining line of the two stringer walls.

Preferably, the skin panel and/or the inner panel also comprises a layered composite material, each layer of the composite material having fibres orientated in a fibre direction and wherein the angles of the fibre direction in each composite layer are chosen such that, where the stringers are bonded to the skin panel and/or the inner panel, the composite layers across the bonded stringers and the skin panel and/or the inner panel are symmetrical either side of a notional line. This provides for symmetrical loading of the bond. The notional line is preferably the centre of the bonded part of the structure. In other words, if the stringer wall is thinner than the skin panel and/or the inner panel, the notional line will be a line on the skin panel and/or the inner panel side of a joining line of the two parts.

Preferably, the structure further comprises at least one rib connected to the inner panel. In a conventional aircraft structure, ribs are connected to a skin panel of the structure. Stringers are also attached to run along the length of the skin panel. The ribs therefore contain cut outs to accommodate the stringers. In embodiments of the present invention, these cut outs are not necessary as the ribs are connected directly to a smooth surface of the inner panel.

More preferably, the rib is connected to the inner panel by bonding a rib foot of the rib to the inner panel. The rib may be bonded to the inner panel by an adhesive. The rib may be bonded to the inner panel by co-curing them at the same time, so that resin in the rib and inner panel co-cures to form a continuous matrix. Co-curing the rib and inner panel together allows for easier inspection and certification of the structure and means the structure is more efficient. It also makes the structure easier and cheaper to produce as an additional adhesive processing step is not required. It also allows the rib foot to be made integral to the inner panel of the structure.

Alternatively or additionally, the rib is connected to the inner panel by bolting the rib foot of the ribs to the inner panel. This method of attachment is especially suitable where the rib in question is expected to be highly loaded.

More preferably, holes are provided in the skin panel to allow access to the bolt holes in the inner panel.

Preferably, the aircraft structure further comprises a second skin panel providing an opposite external face of the structure, and at least one rib connected across a depth of the structure in between the two skin panels.

More preferably, the structure further comprises a second inner panel spaced apart from the inner surface of the second skin panel and being internal to the structure, so as to form a second internal cavity adjacent to the second skin panel and wherein a second plurality of stringers extending along a length of the inner surface of the second skin panel are located within the second cavity.

More preferably, the rib is connected between the two inner panels. Such a structure therefore includes two skin panels, each skin panel being spaced apart from one of the inner panels. The ribs are then attached to the structure by attaching them to the two inner panels. Therefore, cut outs are not required on either side of the ribs as the ribs are connected on both sides to a smooth surface of one of the inner panels.

Preferably, the structure comprises at least one spar extending along a length of the structure in between the two skin panels.

Preferably, the structure is at least a part of a wing box, horizontal tail plane or vertical tail plane or any other cantilevered box structure.

Preferably, at least some of the stringer cells are arranged to transport fluids from one part of an aircraft to another. For example, the hollow elongate stringer cells could be used to transport fuel around the wings, where fuel is traditionally stored. The hollow cells could also be used to vent air or ullage from a fuel storage area. This means that less piping is needed. In addition, the hollow cells could also be used for fuel quantity indication (FQI) equipment. Also, the hollow cells could be used as conduits, for example, for the passage of wires for electrical systems.

According to a second aspect of the invention there is provided an aircraft comprising the aircraft structure as described above.

According to a third aspect of the invention there is also provided a method of manufacturing an aircraft structure, comprising the following steps: providing an external skin panel, providing a plurality of stringers extending along a length of the inner surface of the skin panel, and providing an inner panel internal to the structure, so as to form an internal cavity adjacent to the skin panel containing the stringers.

Preferably, the stringers are in the form of hollow struts, so as to provide a plurality of elongate hollow stringer cells extending along the cavity.

Preferably, at least some of the skin panel, stringers and inner panel comprise a layered composite material.

Preferably, at least some of the stringers, skin panel and inner panel are assembled as un-cured parts and then cured together so that they bond to each other by co-curing.

Preferably, the stringer cells are formed into shape by applying pressure from the core of a hollow composite.

It will of course be appreciated that features described in relation to one aspect of the present invention may be incorporated into other aspects of the present invention. For example, the method of manufacturing an aircraft structure of the invention may incorporate any of the features described with reference to the aircraft structure of the invention and vice versa.

DESCRIPTION OF THE DRAWINGS

Embodiments of the present invention will now be described by way of example only with reference to the accompanying schematic drawings of which:

FIG. 5b shows a detailed perspective view of an end "run out" portion of two stringers on the bottom skin structure of FIG. 5a;

FIG. 9a shows a perspective view of part of a bottom skin structure according to a second embodiment of the invention; and FIG. 9b shows a perspective view of part of a bottom skin structure according to a third embodiment of the invention.

DETAILED DESCRIPTION

Figure 1:
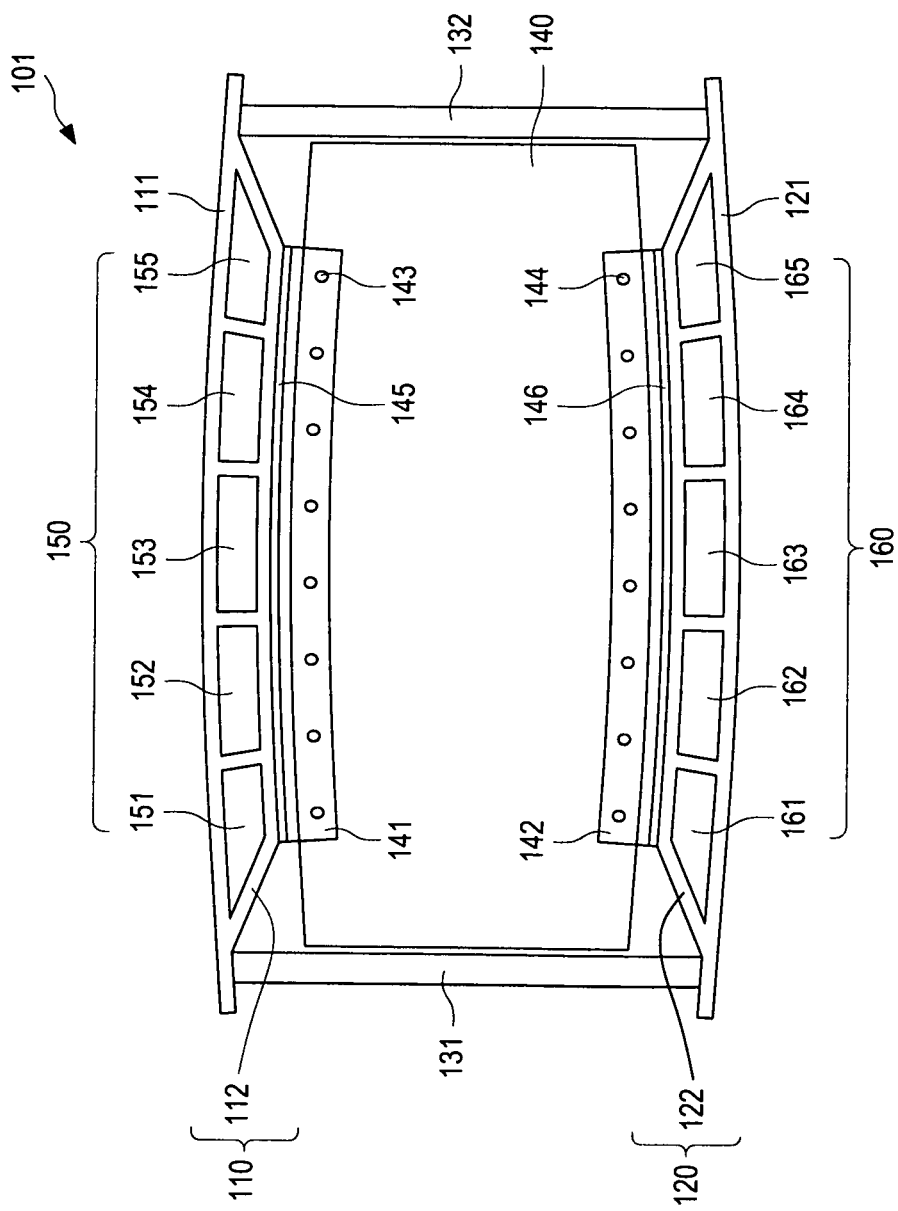
FIG. 1 shows a side sectional view of a wing box structure according to a first embodiment of the invention, showing a first rib.

FIG. 1 shows a side sectional view of a wing box structure 101 according to a first embodiment of the invention. The view is taken from the tip 105 to the root 104 of a port side wing box structure 101.

The wing box structure has a top skin structure 110 and a bottom skin structure 120. These two skin structures are joined together by a front spar 131 and a rear spar 132 extending the height of the wing box structure 101 at the left and right hand sides of the skin structures 110, 120. A plurality of ribs 140, 240 (only one rib 140 shown in FIG. 1) are connected across the width of the wing box structure 101 to both skin structures 110, 120 and to the front 131 and rear 132 spars.

Figure 2:
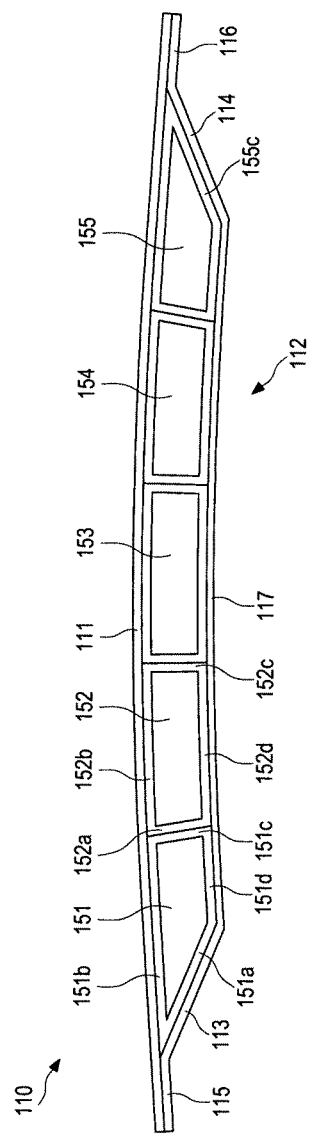
FIG. 2 shows an enlargement of the top skin structure of the wing box structure of FIG. 1.

FIG. 2 shows an enlargement of the top skin structure 110 of the wing box structure 101 of FIG. 1. The top skin structure 110 has a top skin panel 111 extending the width and length of the wing box structure 101. This panel 111 varies in width along its length according to the desired shape of the wing box structure 101 and wing 100 to be made. The panel 111 is made up of a sheet of composite material made up of a plurality of layers of fibres held together by resin. The fibres in each layer are orientated at a certain angle, as will be described later.

The top skin structure 110 also has 5 stringer cells 150 (labelled individually as 151, 152, 153, 154 and 155 from front/left to rear/right) attached to the underside of the top skin panel 111. Each stringer cell 150 is in the form of a hollow strut made from a plurality of layers of fibres held together by resin. The fibres in each layer are orientated at a certain angle, as will be described later. The central stringer cells 152, 153 and 154 are formed in the shape of hollow struts with a hollow rectangle cross-section. For example, in relation to stringer cell 152, the cell comprises a front wall 152a, a top wall 152b, a rear wall 152c and a bottom wall 152d. The end cells 151 and 155 are also hollow struts but with a slanted end rectangle cross-section. For example, in relation to front cell 151, the cell comprises a top wall 151b, a rear wall 151c and a bottom wall 151d. However, bottom wall 151d extends out from the rear wall 151c a significantly shorter distance than top wall 151b and so front wall 151a, that joins the top wall 151b and the bottom wall 151c, is slanted inwards. The rear cell 155 is formed with an opposite shape with a slanted rear wall 155c.

The front and rear walls of the central cells abut each other. Similarly, the rear wall 151c of front cell 151 and the front wall 151a of rear cell 155 abut the front wall of cell 152 and the rear wall of cell 154 respectively. The top walls 150b of all the cells abut the inner side of the top skin panel 111.

A central portion of an inner panel 112 abuts the bottom walls 150d of the cells 150 so as to sandwich the cells 150 between the inner panel 112 and the top skin panel 111. The inner panel 112 also has a front slanted side 113 and a rear slanted side 114 which are slanted in relation to the central portion 117 corresponding to the angle of the front wall 151a of cell 151 and the rear wall 155c of cell 155 to the bottom walls of the cells. These slanted sides 113, 114 abut against the slanted walls of cells 151 and 155. The inner panel 112 also has a front end portion 115 and a rear end portion 116. At the point where the inner panel 112 meets the inner side of the top skin panel 111 the end portions 115, 116 abut the inside of the top skin panel 111 and finish at the same point so that the inner panel 112 has the same width of the top skin panel 111.

As shown in FIG. 1, the rib 140 has an upper rib foot 141 along its top edge. This rib foot 141 is bolted to the top edge of the rib 140 by bolts 143 distributed along the width of the rib 140. The rib foot 141 has a foot portion 145 extending perpendicular to the rib 140 at a small distance above the top edge of the rib. This foot portion 145 abuts and is attached to the underside of the central portion 117 of the inner panel.

The rib 140 is also connected at its sides to the front 131 and rear 132 spars. This connection is not shown in the FIG. 1.

The bottom skin structure 120 and the bottom edge of the rib 140 are substantially similar to the top skin structure 110 and top edge of the rib 140 in construction, as can be seen in FIG. 1. However, the labelling of the reference numerals for the bottom skin structure 120 is as follows:

121=bottom skin panel (equivalent to top skin panel 111 of top skin structure);
122=inner panel (equivalent to inner panel 112 of top skin structure);
123=front slanted side of inner panel (equivalent to front slanted side 113 of inner panel of top skin structure);
124=rear slanted side of inner panel (equivalent to rear slanted side 114 of inner panel of top skin structure);
125=front end portion of inner panel (equivalent to front end portion 115 of inner panel of top skin structure);
126=rear end portion of inner panel (equivalent to rear end portion 116 of inner panel of top skin structure);
127=central portion of inner panel (equivalent to central portion 117 of inner panel of top skin structure);
160=stringer cells (equivalent to stringer cells 150 of top skin structure);
161, 162, 163, 164, 165=individual stringer cells (equivalent to stringer cells 151, 152 153, 154, 155 of top skin structure);
142=lower rib foot (equivalent to upper rib foot 141);
144=bolts (equivalent to bolts 143 of upper rib foot); and 146=foot portion (equivalent to foot portion 145 of upper rib foot).

In addition to these specific reference numerals, it is to be understood that the manufacturing stages and the configuration of the bottom and top skin structures are substantially the same and that, in the following, whenever one skin structure is referred to, the information can equally apply to the other skin structure.

Figure 3:
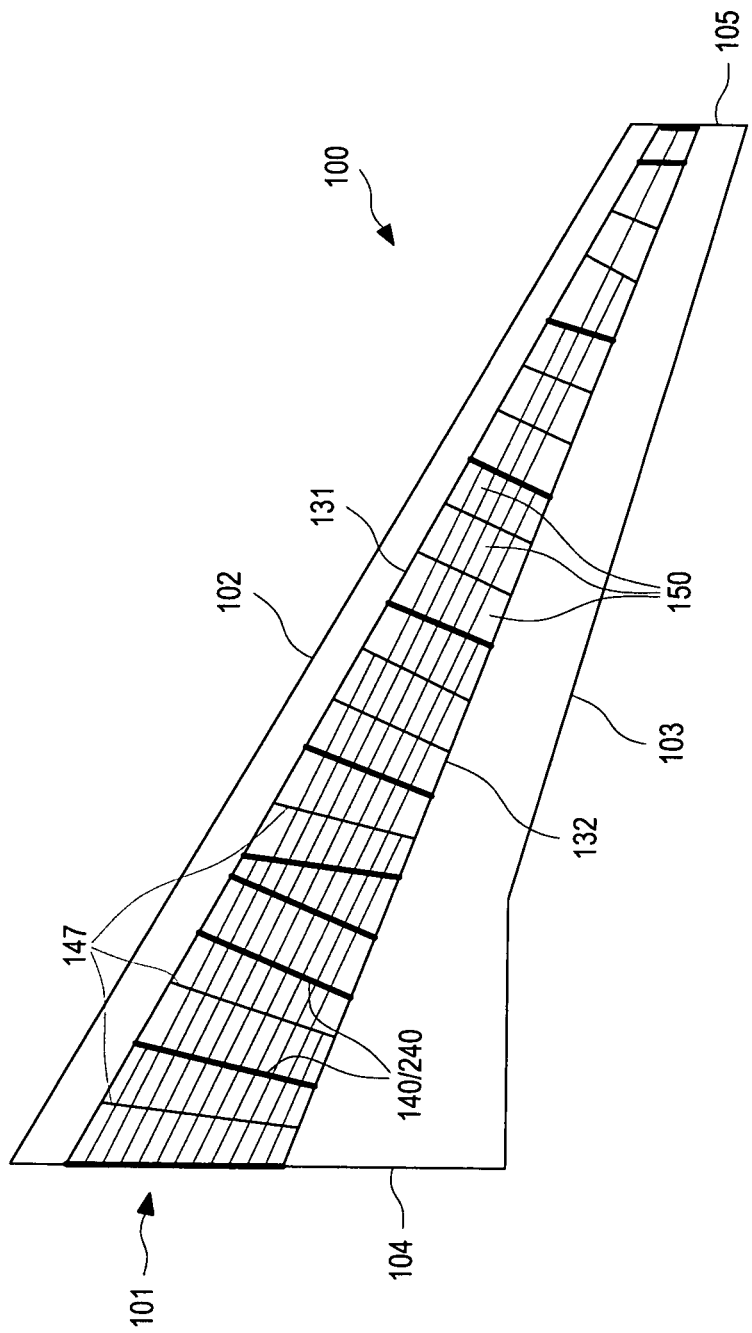
FIG. 3 shows a plan view of a wing including the wing box structure shown in FIGS. 1 and 2.

FIG. 3 shows a plan view of a wing 100 including the wing box structure 101 shown in FIGS. 1 and 2. The wing 101 is shown with its top cover removed. The wing 100 has a leading edge 102 extending at a constant angle backwards from the root 104 to the tip 105. The wing also has a trailing edge 103 extending perpendicular at a root section and then extending backwards from the root section to the tip 105 such that the root is wider than the tip. The wing box structure 101 is contained within the wing 100 and provides the "backbone" or structural strength of the wing 100.

FIG. 3 shows stringer cells 150 of the top skin structure extending from the root 104 to the tip 105 of the wing. Also shown are the various ribs 140/240 (in bold lines) extending across the width of the wing box 101. FIG. 3 also shows (in feint lines) the number and position of ribs 147 that are currently used (in addition to the ribs 140/240 in bold lines) on an aircraft in the Airbus A300 family. This figure shows that when using the wing box structure 101 of embodiments of the invention, fewer ribs are required to be used.

As can be seen in FIG. 3, front spar 131 extends backwards at a constant angle from root 104 to tip 105. Rear spar 132 also extends backwards at an angle smaller than the front spar 131. Hence, the wing box 101 has a larger width at its root 104 than its tip 105. FIG. 3 shows stringer cells 150 of the top skin structure extending from the root 104 to the tip 105 of the wing. It can also be seen that the width of each individual stringer cell is constant along its length. However, as the available width of the wing box decreases from the root 104 to the tip 105, the number of stringer cells 150 reduces. This is done by gradually "running out" the stringers towards the tip 105, as will be described below, in relation to the bottom skin structure.

Figure 4:
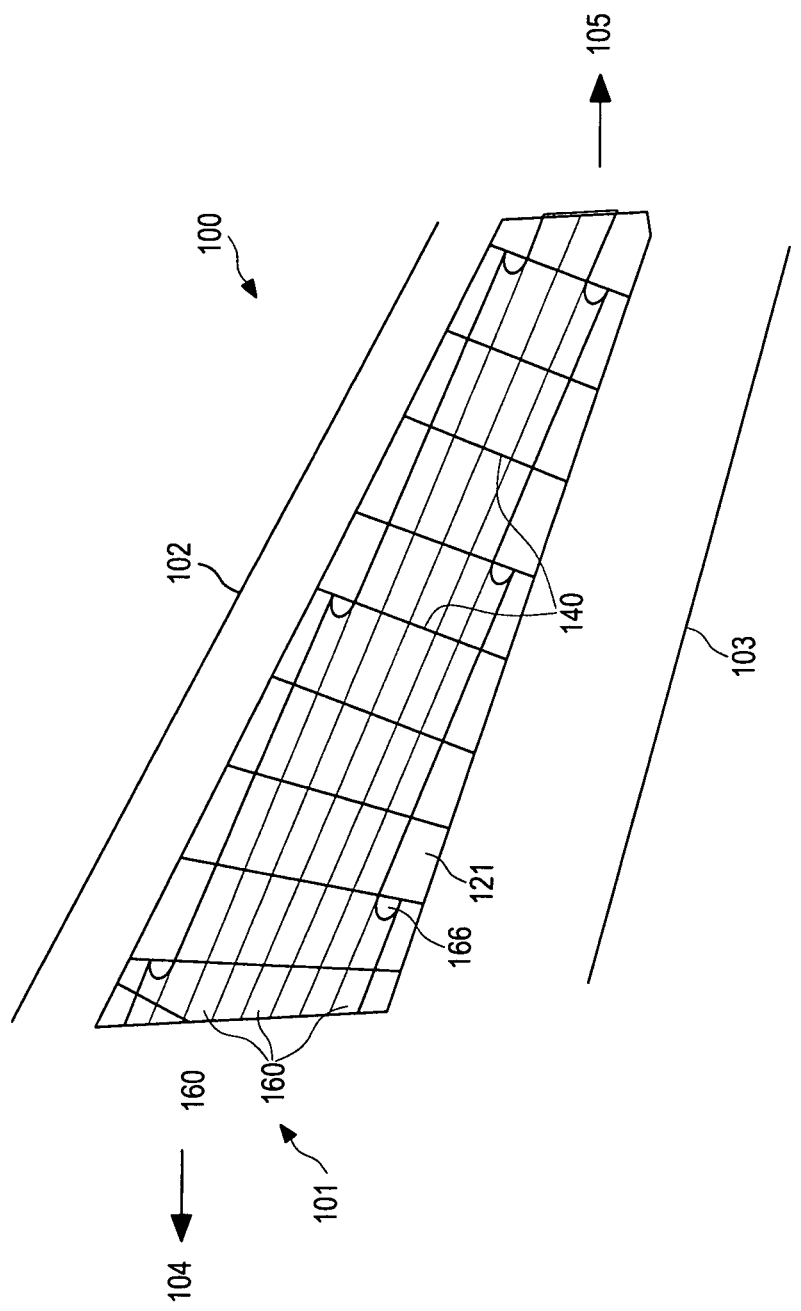
FIG. 4 shows an enlarged plan sectional view of part of the wing of FIG. 3, showing the bottom skin structure.

FIG. 4 shows an enlarged plan sectional view of the wing of FIG. 3, showing the bottom skin structure 120. This shows stringer cells 160 of the bottom skin structure 120 extending from the root 104 to the tip 105 of the wing 100 on top of the bottom skin panel 121. In a similar way to the top skin structure 110 shown in FIG. 3, it can be seen that the width of each individual stringer cell 160 is constant along its length. However, as the available width of the wing box 101 decreases from the root 104 to the tip 105, the number of stringer cells 160 reduces. This is done by gradually "running out" the stringers towards the tip 105.

Figure 5A:
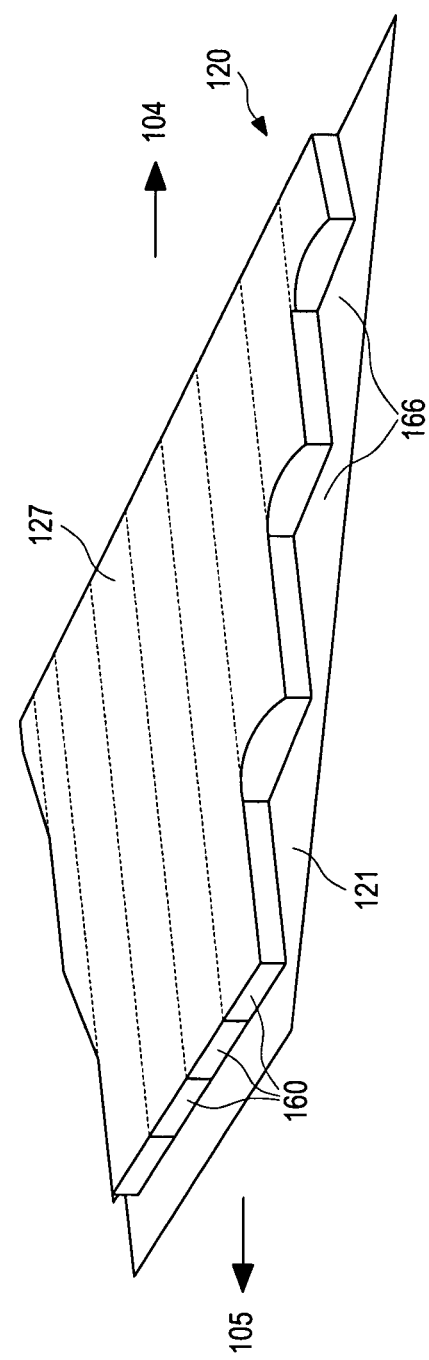
FIG. 5a shows a perspective view of part of the bottom skin structure shown in FIG. 4.

Various stringer run out regions 166 are shown in FIG. 4 and FIG. 5a. In these regions, it can be seen that if the stringer 160 was allowed to extend much further along the length, it would extend outside of the bottom skin panel 121. Hence, the stringer cell 160 is ended at a region 166 a slight distance back from the edge of the bottom skin panel 121. As can be seen in FIG. 4, the various run out regions 166 are distributed around the edge of the bottom skin panel 121 so as to even out the amount of load being transmitted back to the bottom skin panel 121 from the inner panel 122 as much as possible.

Figure 5B:
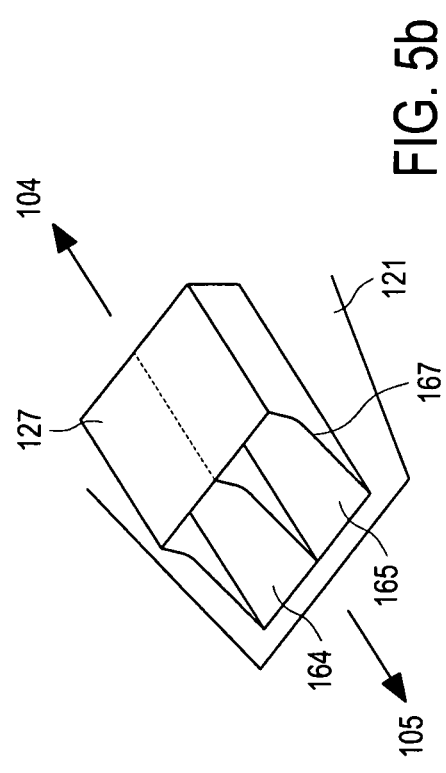

FIG. 5b shows a detailed perspective view of an end "run out" region 166 of two stringers 164 and 165. Here it can be seen that the ends of the stringer cells themselves are shaped so that the front and rear walls of the cells taper 167 from the top wall to the longer bottom wall. This is also done to even out the amount of load being transmitted back to the bottom skin panel 121 from the inner panel 122 as much as possible.

FIG. 6 generally shows a manufacturing process used to make the top skin structure 110 of the wing box structure 101 described above. A similar process is also used to make the bottom skin structure 120.

Figure 6A:
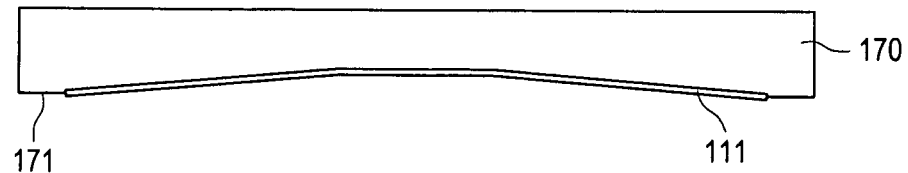
FIG. 6a shows a first stage of manufacture of the wing box structure.

FIG. 6a shows a first stage of manufacture. Here, the uncured composite layers of the top skin panel 111 are layered by Automated Tape Laying (ATL) on an upper tool 171.

Figure 6B:
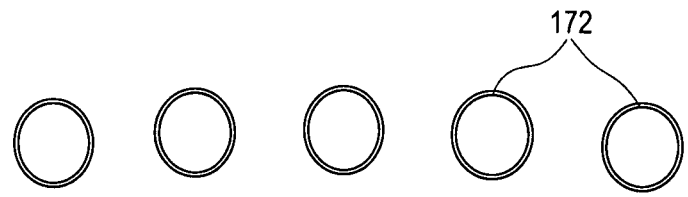
FIG. 6b shows a second stage of manufacture of the wing box structure.

FIG. 6b shows a second stage of manufacture. Here, filament windings 172 of uncured composite layers are made for each stringer cell 150.

Figure 6C:
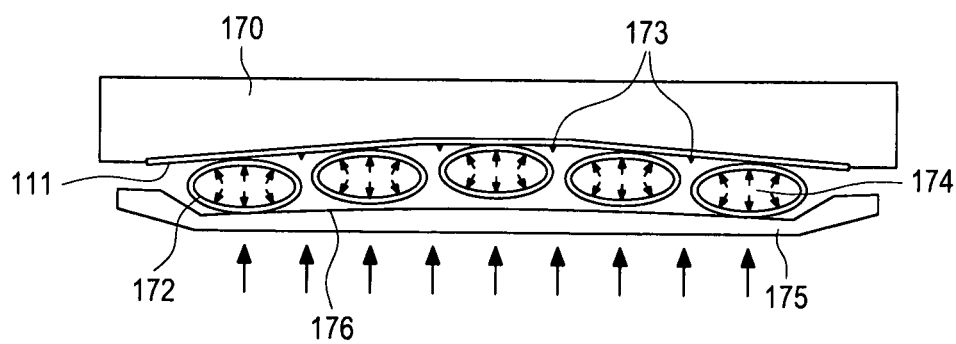
FIG. 6c shows a third stage of manufacture of the wing box structure.

FIG. 6c shows a third stage of manufacture. Here, noodles 173 are placed on the inner side of the top skin panel 111 at each point where a stringer cell will meet another stringer cell. These noodles are made from a paste or a resin (so as to minimise their weight) and are shaped so as to provide a rounded corner shape (shown in more detail in FIG. 7) for the filament windings 172. The filament windings 172 are then placed next to the inner side of the top skin panel. These filament windings 172 are then press formed by a pressing tool 175 (with a profile to match the profile of the inner panel) and provided with internal pressure 174 from pressure bags inside the hollow struts. These two pressure forces combined with the shape of the noodles 173 and the pressing tool 175 acts to produce the stringer cells with their required rectangular and slanted rectangular cross-sections with rounded corners. However, the noodles 173 ensure that the cross-sections have rounded corners, as shown in FIG. 7.

Figure 6D:
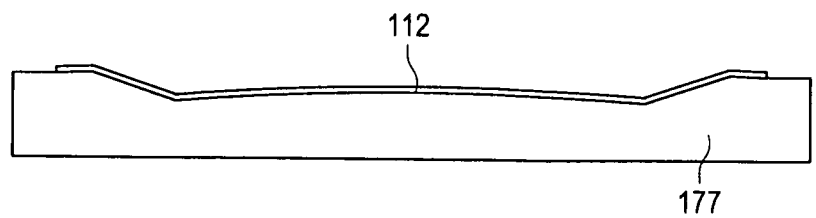
FIG. 6d shows a fourth stage of manufacture of the wing box structure.

FIG. 6d shows a fourth stage of manufacture. Here, the uncured composite layers of the inner panel 112 are layered by Automated Tape Laying (ATL) on a lower tool 177. The lower tool 177 has a profile to match the required profile of the inner panel.

The inner panel 112 is then brought into contact with the formed stringer cells and skin panel and the whole assembly is co-cured so that the skin panel, stringer cells and inner panel bond together.

Figure 7:
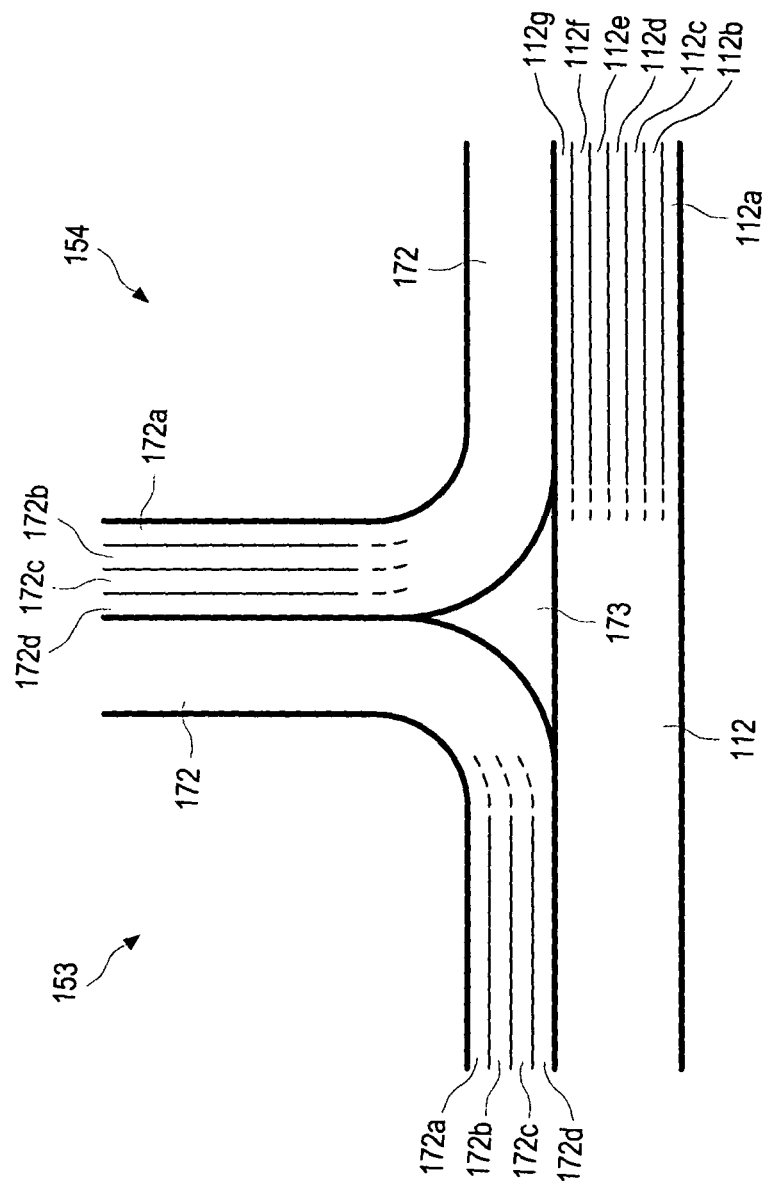
FIG. 7 shows an enlarged side sectional view of the composite layers forming an inner panel and two stringers of the wing box structure.

FIG. 7 shows an enlarged end sectional view of the composite layers forming the inner panel 112 and two stringers 153 and 154. Stringers 153 and 154 are made from four composite layers 172a, 172b, 172c and 172d, extending from the inside of the stringer cell to the outside of the stringer cell. These layers have different orientations of fibres within them, as follows:

172a has fibres at +45 deg;
172b has fibres at −45 deg;
172c has fibres at 0 deg; and
172d has fibres at 90 deg.

Hence, the total thickness across the join between the rear wall of stringer cell 153 and the front wall of stringer cell 154, is symmetrical in terms of the layering of the fibres in the composites.

Inner panel 112 is made from seven composite layers 112a, 112b, 112c, 112d, 112e, 112f and 112g, extending from the bottom of the inner panel to the top of the inner panel. These layers have different orientations of fibres within them, as follows:

112a has fibres at +45 deg;
112b has fibres at −45 deg;
112c has fibres at 0 deg;
112d has fibres at 90 deg;
112e has fibres at +45 deg;
112f has fibres at 0 deg; and
112g has fibres at +45 deg.

Hence, the total thickness across the join between the bottom walls of stringer cells 153 and 154 and the inner panel, are symmetrical in terms of the layering of the fibres in the composites. In order for this to be the case, layers 112a to 112d are the same as 172a to 172d and layers 112e to 112g form a symmetrical pattern of layer orientation; in this case +45/0/+45 deg.

Figure 8:
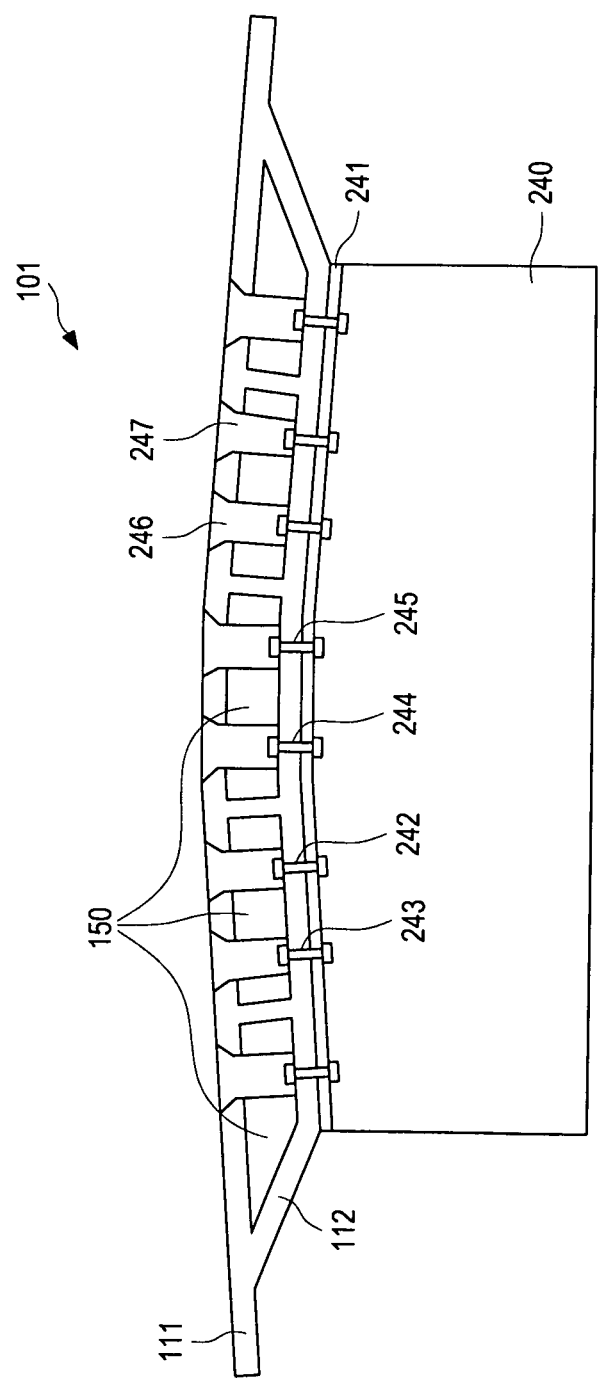
FIG. 8 shows a different side sectional partial view of the wing box structure showing a different rib.

FIG. 8 shows a side sectional partial view of the wing box structure 101, showing a different rib 240. This rib 240 is designed as a highly loaded rib and so must be secured to the structure in a different way to rib 140. Here, reference numerals indicating substantially similar features as described above are given the same labelling. However, new features or different features are given reference numerals such as 240, 241 etc.

Rib 240 has an upper rib foot 241 formed as a perpendicular flange of the rib 240 along its top edge. The rib foot 241 has a plurality of holes 242 distributed along the width of the flange to accommodate bolts 243. For each bolt 243, the inner panel 112 and the bottom walls of the stringer cells 150 are also provided with aligned holes 244, 245 so that the bolts 243 can pass though the inner panel 112 and the bottom walls of the stringer cells 150 to attach the rib 240 to the top skin structure 110. In addition, the top skin panel 111 and the top walls of the stringer cells 150 are provided with aligned access holes 246, 247 corresponding to each bolt 243 so that the bolts can be secured in place.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The stringer cells 150, 160 may be manufactured to have a varying cross-sectional area such that they get smaller along their length. In other words, they are manufactured using a variable cross-sectional area mandrel. As the size of the stringers gets smaller, there is no need to "run out" the stringers along the length of the wing box structure 101, as instead, the stringers simply decrease in size to fit the same number of stringers into a smaller width.

Also, the stringer cells 150, 160 may be manufactured by filament winding and then shaped individually by press forming. In particular, the central cells 152, 153, 154, 162, 163, 164 would be shaped by press forming first and then attached to the skins 111, 112. The front and rear cells 151, 155, 161, 165 would be then shaped and attached to the skins 111, 112 next to the central cells.

Also, the stringer cells 150, 160 may be placed so as to be parallel to the spars 131, 132 so the "run outs" 166 only need occur in regions near one of the spars. In other words, the run outs 166 could all be near the front spar 131 or all be near the rear spar 132.

FIGS. 9a and 9b show two alternatives for the stringer run out regions. The labelling of the reference numerals for these figures is the same as for FIG. 5a but with "a" or "b" to represent the two different embodiments. As before, in these regions, it can be seen that if the stringer 160a/b was allowed to extend much further along the length, it would extend outside of the bottom skin panel 121a/b. Hence, the stringer cell 160a/b is ended at a region 166a/b a slight distance back from the edge of the bottom skin panel 121a/b. As can be seen, the various run out regions 166a/b are distributed around the edge of the bottom skin panel 121a/b so as to even out the amount of load being transmitted back to the bottom skin panel 121a/b from the inner panel 122a/b as much as possible.

FIG. 9a shows that each stringer cell 160a, when it is the outermost cell, having a tapered side wall 165c so as to give the stringer cell a widened out tapered portion. Hence, each stringer cell 160a has an end portion with a cross-sectional shape similar to cells 151, 155, 161 and 165 shown in FIG. 1.

FIG. 9b shows that each stringer cell 160b has a constant cross-section, even at the end portion of each stringer. Instead, local tapered cells 265c are placed against the edges of the outermost stringer cells to create the required geometry. These cells 265c may be solid and may be made from structural foam. This aids manufacture of the structure. For example, the shape of the local taper cells 265c acts to produce the required shape of the stringer cells as the filament windings are press formed and provided with internal pressure. Alternatively, the local taper cells 265c may be hollow.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft structure comprising;
   (i) a skin panel, having;
      an outer surface forming an external face of the structure, and
      an inner surface internal to the structure;
   (ii) a plurality of stringers extending along a length of the inner surface of the skin panel, wherein each stringer is a discrete element of the structure; and
   (iii) an inner panel spaced apart from the inner surface of the skin panel and being internal to the structure, so as to form an internal cavity adjacent to the skin panel, wherein the stringers are located within the cavity.

2. An aircraft structure as claimed in claim 1, wherein the stringers have a height so as to extend across the entire height of the cavity from the inner surface of the skin panel to the inner panel.

3. An aircraft structure as claimed in claim 1, wherein the stringers are in the form of hollow struts, so as to provide a plurality of elongate hollow stringer cells extending along the cavity.

4. An aircraft structure as claimed in claim 3, wherein a plurality of the stringer cells have a cross-section substantially in the shape of a hollow rectangle and wherein the stringer cells are arranged side-by-side in the cavity such that a side wall of each stringer cell abuts a side wall of an adjacent stringer cell so that there are substantially no gaps in between the cells.

5. An aircraft structure as claimed in claim 1, wherein the inner panel is bonded to the inner surface of the skin panel at an outer edge portion of the inner panel.

6. An aircraft structure as claimed in claim 5, wherein the inner panel comprises:
   a central section spaced apart from the inner surface of the skin panel;

the outer edge portion bonded to the inner surface of the skin panel; and an angled intermediate portion extending towards the inner surface of the skin panel from the central section to the outer edge portion.

7. An aircraft structure as claimed in claim 1, wherein the stringers comprise a layered composite material.

8. An aircraft structure as claimed in claim 7, wherein each layer of the composite material has fibres orientated in a fibre direction and wherein the angles of the fibre direction in each of the composite layers are chosen such that, where two stringers are bonded to one another, the composite layers across the two stringers are symmetrical with respect to fibre direction angles either side of a notional line.

9. An aircraft structure as claimed in claim 7, wherein at least one of the skin panel and the inner panel also comprises a layered composite material, each layer of the composite material having fibres orientated in a fibre direction and wherein the angles of the fibre direction in each of the composite layers are chosen such that, where the stringers are bonded to said at least one of the skin panel and the inner panel, the composite layers across the bonded stringers and said at least one of the skin panel and the inner panel are symmetrical with respect to fibre direction angles either side of a notional line.

10. An aircraft structure as claimed in claim 1, wherein aircraft structure further comprises;

(i) a second skin panel providing an opposite external face of the structure, and (ii) at least one rib connected across a depth of the structure in between the two skin panels.

11. An aircraft structure as claimed in claim 10, wherein the structure further comprises a second inner panel spaced apart from the inner surface of the second skin panel and being internal to the structure, so as to form a second internal cavity adjacent to the second skin panel and wherein a second plurality of stringers extending along a length of the inner surface of the second skin panel are located within the second cavity.

12. An aircraft structure as claimed in claim 11, wherein the rib is connected between the two inner panels.

13. An aircraft structure as claimed in claim 1, wherein the structure is at least a part of a wing box, horizontal tail plane or vertical tail plane.

14. An aircraft structure as claimed in claim 13, wherein at least some of the stringer cells are arranged to transport fluids from one part of an aircraft to another.

15. An aircraft comprising the aircraft structure of claim 1.

* * * * *